US011895369B2

(12) United States Patent
Hines

(10) Patent No.: US 11,895,369 B2
(45) Date of Patent: Feb. 6, 2024

(54) MEDIA-AWARE NAVIGATION METADATA

(71) Applicant: DOLBY LABORATORIES LICENSING CORPORATION, San Francisco, CA (US)

(72) Inventor: Christopher Graham Hines, Sydney (AU)

(73) Assignee: DOLBY LABORATORIES LICENSING CORPORATION, San Francisco, CA (US)

( * ) Notice: Subject to any disclaimer, the term of this patent is extended or adjusted under 35 U.S.C. 154(b) by 0 days.

(21) Appl. No.: 16/640,035

(22) PCT Filed: Aug. 22, 2018

(86) PCT No.: PCT/US2018/047532
§ 371 (c)(1),
(2) Date: Feb. 18, 2020

(87) PCT Pub. No.: WO2019/046065
PCT Pub. Date: Mar. 7, 2019

(65) Prior Publication Data
US 2020/0236440 A1 Jul. 23, 2020

Related U.S. Application Data

(60) Provisional application No. 62/550,747, filed on Aug. 28, 2017.

(30) Foreign Application Priority Data

Aug. 28, 2017 (EP) .................................. 17188118

(51) Int. Cl.
*H04N 21/433* (2011.01)
*H04N 21/472* (2011.01)
(Continued)

(52) U.S. Cl.
CPC ..... *H04N 21/47217* (2013.01); *H04N 21/435* (2013.01); *H04N 21/4333* (2013.01);
(Continued)

(58) Field of Classification Search
CPC ........................ H04N 21/235; H04N 21/2552
See application file for complete search history.

(56) References Cited

U.S. PATENT DOCUMENTS 8,913,189 B1 * 12/2014 Mincher ............ H04N 21/4394
348/515
9,564,177 B1 2/2017 Gray
(Continued)

FOREIGN PATENT DOCUMENTS

CN 1445989 A 10/2003
CN 1922690 A 2/2007
(Continued)

*Primary Examiner* — Mushfikh I Alam

(57) ABSTRACT

The present disclosure relates to methods and apparatus for processing media content having video content and associated audio content. A method of processing media content having video content and associated audio content comprises the method includes receiving the video content and the associated audio content, analyzing the associated audio content, determining one or more navigation points for enabling navigation of the media content based on the analysis, wherein the one or more navigation points indicate points of interest in the associated audio content for short-term rewinding and/or fast forwarding, embedding the one or more navigation points into metadata for the media content, and outputting the video content, the associated audio content, and the metadata.

18 Claims, 4 Drawing Sheets

(51) Int. Cl.
*H04N 21/435* (2011.01)
*H04N 21/439* (2011.01)
*H04N 21/44* (2011.01)
*H04N 21/462* (2011.01)
*H04N 21/4728* (2011.01)
*H04N 21/6587* (2011.01)
*H04N 21/845* (2011.01)
*H04N 21/43* (2011.01)

(52) U.S. Cl.
CPC ... *H04N 21/43072* (2020.08); *H04N 21/4394* (2013.01); *H04N 21/4398* (2013.01); *H04N 21/44016* (2013.01); *H04N 21/4621* (2013.01); *H04N 21/4728* (2013.01); *H04N 21/6587* (2013.01); *H04N 21/8455* (2013.01)

(56) References Cited

U.S. PATENT DOCUMENTS

| | | | |
|---|---|---|---|
| 11,399,121 B2* | 7/2022 | McIntosh | H04N 5/04 |
| 2002/0049974 A1* | 4/2002 | Shnier | G06F 16/40 |
| | | | 725/47 |
| 2006/0080716 A1 | 4/2006 | Nishikawa | |
| 2007/0098350 A1* | 5/2007 | Gibbon | H04N 21/4394 |
| | | | 386/241 |
| 2007/0112562 A1 | 5/2007 | Vainio | |
| 2007/0113182 A1 | 5/2007 | Hollemans | |
| 2008/0140385 A1 | 6/2008 | Mahajan | |
| 2008/0226256 A1* | 9/2008 | Ljolje | H04N 5/765 |
| | | | 386/222 |
| 2008/0235741 A1* | 9/2008 | Ljolje | H04N 5/783 |
| | | | 725/89 |
| 2009/0069917 A1 | 3/2009 | Yamashita | |
| 2009/0132924 A1 | 5/2009 | Vasa | |
| 2009/0148133 A1* | 6/2009 | Nomura | H04N 5/775 |
| | | | 386/262 |
| 2010/0042642 A1 | 2/2010 | Shahraray | |
| 2010/0298959 A1 | 11/2010 | Sekiguchi | |
| 2011/0142428 A1* | 6/2011 | Stenberg | H04N 21/472 |
| | | | 345/173 |
| 2011/0267419 A1* | 11/2011 | Quinn | G06F 3/04842 |
| | | | 348/14.08 |
| 2012/0197650 A1 | 8/2012 | Resch | |
| 2013/0011116 A1 | 1/2013 | Barrett | |
| 2013/0283143 A1* | 10/2013 | Petajan | G06F 16/48 |
| | | | 715/230 |
| 2014/0002736 A1* | 1/2014 | Kaushal | H04N 21/8455 |
| | | | 348/468 |
| 2015/0070587 A1* | 3/2015 | Emeott | H04N 21/4882 |
| | | | 348/589 |
| 2015/0120648 A1 | 4/2015 | Slovacek | |
| 2015/0237454 A1* | 8/2015 | Scheirer | H04S 7/30 |
| | | | 381/17 |
| 2015/0245103 A1* | 8/2015 | Conte | G06Q 30/0643 |
| | | | 725/60 |
| 2015/0373281 A1* | 12/2015 | White | G11B 27/002 |
| | | | 348/660 |
| 2016/0330396 A1* | 11/2016 | Garcia Navarro | H04N 21/42204 |
| 2017/0110151 A1* | 4/2017 | Matias | G06K 9/00758 |
| 2017/0230693 A1* | 8/2017 | Thoma | H04H 20/103 |
| 2017/0244959 A1* | 8/2017 | Ranjeet | G06T 7/292 |
| 2017/0257410 A1* | 9/2017 | Gattis | H04N 21/8455 |
| 2017/0357430 A1* | 12/2017 | Lemay | G06F 16/70 |
| 2017/0366857 A1* | 12/2017 | Sun | H04N 21/4415 |
| 2017/0374423 A1* | 12/2017 | Anderson | H04N 21/4532 |
| 2018/0014074 A1* | 1/2018 | Li | H04N 21/47217 |
| 2018/0048831 A1* | 2/2018 | Berwick | H04N 5/23218 |
| 2018/0376187 A1* | 12/2018 | Everett | H04N 21/25883 |
| 2019/0200099 A1* | 6/2019 | Misra | H04N 21/44213 |
| 2020/0145701 A1* | 5/2020 | Liu | H04N 9/8205 |
| 2020/0219614 A1* | 7/2020 | Bjørkmann | H04L 9/088 |
| 2020/0396497 A1* | 12/2020 | Liu | H04N 21/4826 |

FOREIGN PATENT DOCUMENTS

| | | |
|---|---|---|
| CN | 101518098 B | 8/2009 |
| CN | 102215367 A | 10/2011 |
| CN | 104078050 A | 10/2014 |
| CN | 104717571 A | 6/2015 |
| CN | 104902331 B | 9/2015 |
| GB | 2496285 | 5/2013 |
| WO | 2008119372 | 10/2008 |
| WO | 2009071344 | 6/2009 |
| WO | 2014113465 | 7/2014 |
| WO | 2015148046 | 10/2015 |
| WO | 2015180866 | 12/2015 |

* cited by examiner

MEDIA-AWARE NAVIGATION METADATA

CROSS REFERENCE TO RELATED APPLICATIONS

This application claims priority to U.S. Provisional Patent Application No. 62/550,747, filed on Aug. 28, 2017, and European Patent Application No. 17188118.8 filed on Aug. 28, 2017, the disclosures all of which are incorporated herein by reference in their entirety.

TECHNICAL FIELD

The present disclosure relates to methods of processing media content comprising video content and associated audio content. The present disclosure further relates to methods of generating media-aware navigation metadata for the media content, for example media-aware navigation metadata for enhanced user experience during playback of the media content. The present disclosure also relates to corresponding apparatus, such as encoders or decoders, for example. The present disclosure is particularly, though not exclusively, applicable to the AC-4 codec.

BACKGROUND

When consuming media content including video content and associated audio content (e.g., via a streaming service), such as a movie or a TV show, for example, the case may arise that one of the users (e.g., viewers) misses content. For example, the user may not fully catch or otherwise mishear what an actor has just said. In conventional media players, there is the option to pause, rewind, and play again. For an Apple TV®, the user can ask Siri to replay. For a TiVo®, the user can press the instant replay button. However, conventional methods for replaying the missed content are not aware of the actually missed content. As a consequence, the media content is often rewound too far back, or to a point halfway through an actor's dialog. This experience can be frustrating for the user consuming the media content.

Subtitle timecodes are not suited to overcome this issue, as they do not always appear in synchronization with the audio content (for example, long subtitles tend to show up well before actors actually start speaking).

Thus, there is a need for an improved method and apparatus for processing media content that includes video content and associated audio content. There is further need for such method and apparatus that enable content-aware media navigation.

SUMMARY

According to an aspect of the disclosure, a method of processing media content that has video content (e.g., a video track or a portion of a video track) and associated audio content (e.g., an audio track, such as a speech or dialog track or a portion of an audio track) is described. The method may also be said to be a method of generating metadata for the media content. The audio content may be aligned (time-aligned) with the video content. The media content may be received in a bitstream, or from a media content storage part (storage unit). The method may include receiving the video content and the associated audio content. The method may further include analyzing the associated audio content. The method may further include determining, based on the analysis, one or more navigation points for enabling navigation of the media content. The one or more navigation points may indicate points of interest in the associated audio content for short-term rewinding and/or fast forwarding. The navigation points may be jump points, for example. The method may further include embedding the one or more navigation points into metadata for the media content. The method may yet further include outputting the video content, the associated audio content, and the metadata. The metadata may be usable by an application (e.g., a media player application) for generating an audio-visual representation of the media content. The metadata may be aligned with the associated audio content (likewise, the metadata may be said to be aligned with the video content). Further, the metadata may enable content-aware navigation of the media content (e.g., content-aware navigation of the video content).

Configured as such, the proposed method adds useful metadata to the media content (e.g., to the bitstream, such as an AC-4 bitstream) that allows for high-resolution content-aware navigation through media content at the playback end. Accordingly, users are enabled to directly jump to points in the media content that are of interest to them, such as the beginning of a dialog utterance that they may have misheard. This avoids the oftentimes frustrating inaccuracies in the navigation through the media content, and there is no unnecessary replay of media content that precedes the point of interest. Since many encoders (e.g., AC-4 encoders) perform dialog detection by standard for purposes of dialog enhancement, the proposed method, when performed at such encoder, does not require significant increase in computational complexity. Moreover, positioning of the navigation point can be highly accurate if separate dialog tracks are available, as is oftentimes the case.

In some embodiments, the media content may include associated metadata. The associated metadata may be dialog-enhancement metadata that may be aligned (e.g., time-aligned) with the associated audio content. In this case, the method may further include analyzing the associated audio content and the associated metadata.

In some embodiments, analyzing the audio content may involve applying speech detection to the audio content. As noted above, speech detection may be performed by standard in many encoders in the context of dialog detection/enhancement, so that the aforementioned analysis requires little additional computational complexity.

In some embodiments, the one or more navigation points may be placed at respective starting points of spoken utterances (dialog utterances) included in the associated audio content. The navigation points may be placed at respective starting points of spoken sentences in the associated audio content, for example. Thus, the navigation points may be unevenly spaced. In other words, there may be a first offset (e.g., time offset or sample offset) between a first pair of adjacent navigation points and a second offset between a second pair of adjacent navigation points, with the first offset being different from the second offset. This enables targeted navigation to dialog utterances that may have been misheard by a user or that the user wishes to listen to again for some reason.

In some embodiments, the one or more navigation points may indicate respective offsets from a starting point of a respective current frame. Thereby, the navigation points can be represented in a particularly simple and efficient manner.

In some embodiments, the method may further include applying dialog detection to the associated audio content. Then, analyzing the associated audio content may be based at least in part on a result of the dialog detection. Said dialog detection may be performed in the context of or for purposes of dialog enhancement or generating metadata for dialog enhancement. Dialog enhancement is a standard feature in many modern-day encoders. The proposed method may advantageously re-use results of the dialog enhancement processing for purposes of generating metadata that enables content-aware navigation through the media content.

In some embodiments, the method may be performed at an encoder for encoding the media content. Then, the method may further include receiving an input of one or more additional navigation points. The one or more additional navigation points may be generated by an operator. For example, the one or more additional navigation points may relate to points of interest in the video content and/or the associated audio content. If the method is performed at the encoder, the media content may be received from a media content storage part. Performing the generation of the one or more navigation points for embedding into the metadata in an offline manner may yield very accurate placement of the navigation points, which may significantly improve user experience.

In some embodiments, the method may further include generating an audio-visual representation of the media content based on the video content, the associated audio content, and the metadata. This may be particularly the case if the method is performed at a playback environment.

In some embodiments, the method may further include modifying and replaying the media content with improved intelligibility and/or coherence (e.g., performing dialog enhancement, increasing program playback loudness, muting non-dialog audio tracks, enabling of subtitles) in response to a user instruction instructing replay from one of the one or more navigation points. These measures may be temporal measures. For example, the dialog enhancement may be temporal dialog enhancement. In some embodiments, the dialog enhancement may fade out over time. In particular, a level of dialog enhancement may commence to return to zero at the next (i.e., subsequent) navigation point or once the position from which the rewind has been performed is reached. This is procedure is proposed based on the fact that a user who intends to jump back to a certain part of dialog or speech typically has not caught at least part of the certain part of dialog or speech. The proposed method enables targeted dialog enhancement of such dialog or speech, thereby increasing the user experience. On the other hand, dialog enhancement is temporal, i.e., is selectively applied to the section of dialog that is of particular interest to the user.

In some embodiments, the method may further include extracting still images from the video content at timings indicated by the one or more navigation points. The method may yet further include providing a visual representation of a sequence of the extracted still images for guiding user navigation of the media content. Alternatively or additionally, the method may further include setting a scan rate for scanning through the media content at least in part based on a density of the one or more navigation points over time. Alternatively or additionally, the method may further include setting a correspondence between points on a visual representation of a scan bar and points in time in the video content at least in part based on a density of the one or more navigation points over time. Thereby, scanning or browsing through the media content may offer higher resolution and may enable targeted navigation to points in the media content that are of particular interest to the user.

In some embodiments, the method may further include providing a fast-forward replay mode in which respective portions of the media content are replayed starting from respective ones of the one or more navigation points. This is another approach for increasing resolution in scanning or browsing through the media content that may enable targeted navigation to points in the media content that are of particular interest to the user.

In some embodiments, the method may further include resuming playback after a pause of the replay at a timing indicated by a most recent one of the one or more navigation points. Thereby, user experience is improved especially in cases in which an extended amount of time has elapsed since pausing replay of the media content.

Another aspect relates to an encoder. The encoder may include a processor and a memory storing instructions for causing the processor to perform the operations (e.g., method steps) outlined in the present disclosure.

Another aspect relates to a decoder. The decoder may include a processor and a memory storing instructions for causing the processor to perform the operations outlined in the present disclosure.

Another aspect relates to a program (software program). The software program may be adapted for execution on a processor and for performing the method steps outlined in the present disclosure when carried out on a computing device.

Another aspect relates to a computer-readable storage medium. The storage medium may include a program (software program) adapted for execution on a processor and for performing the method steps outlined in the present disclosure when carried out on a computing device.

Yet another aspect relates to a computer program product. The computer program may include executable instructions for performing the operations outlined in the present disclosure when executed on a computer.

It should be noted that the methods and apparatus including its preferred embodiments as outlined in the present disclosure may be used stand-alone or in combination with the other methods and systems disclosed in this disclosure. Furthermore, all aspects of the methods and apparatus outlined in the present disclosure may be arbitrarily combined. In particular, the features of the claims may be combined with one another in an arbitrary manner.

BRIEF DESCRIPTION OF THE DRAWINGS

Example embodiments of the present disclosure are explained below with reference to the accompanying drawings, wherein identical reference numerals indicate like or similar elements, and wherein.

DETAILED DESCRIPTION

Figure 1:
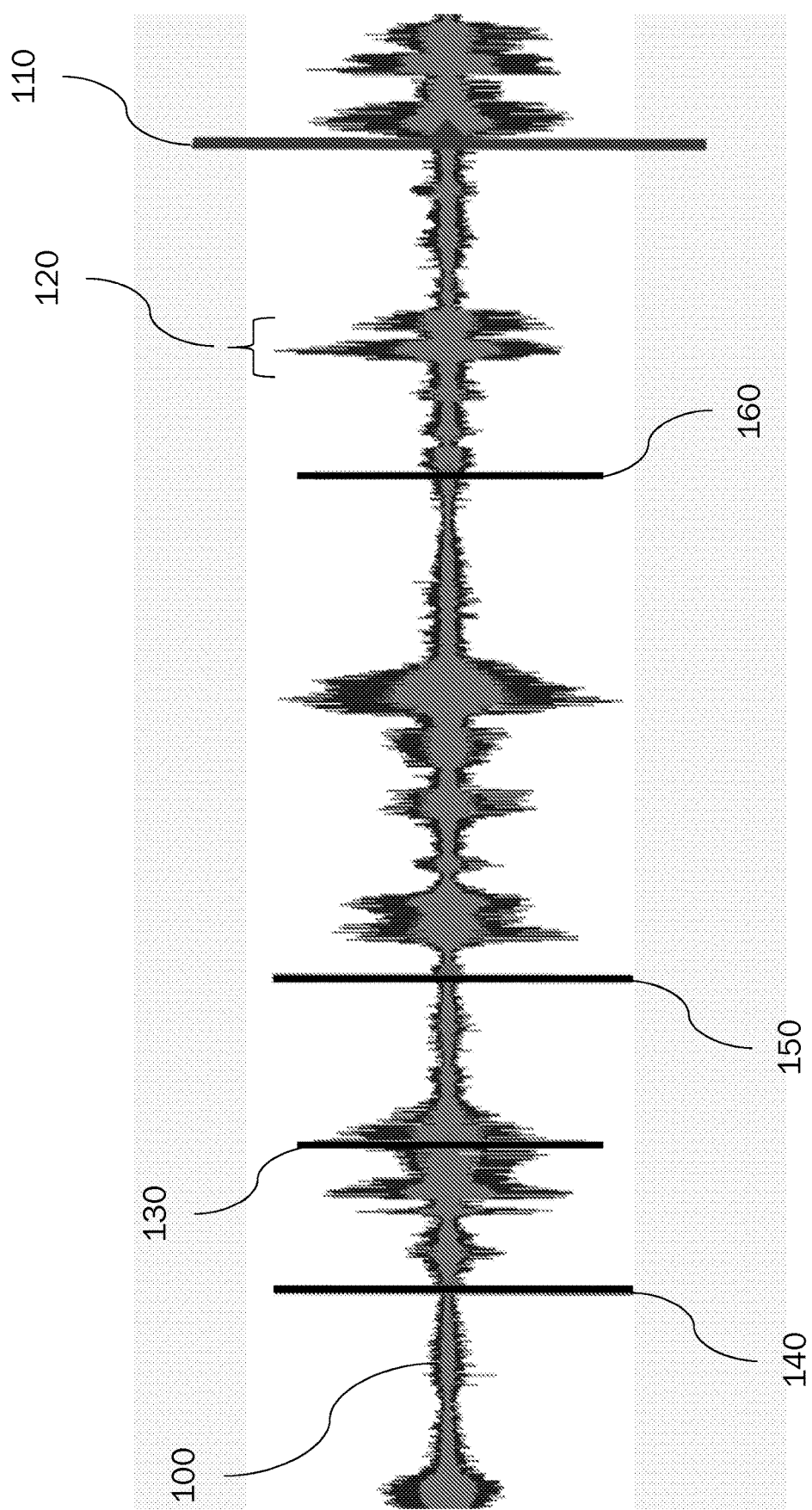
FIG. 1 schematically illustrates an example of an audio track to which embodiments of the disclosure may be applied.

FIG. 1 schematically illustrates an example of an audio track 100 to which embodiments of the disclosure may be applied. The audio track 100 in this example is a speech or dialog track (or at least an audio track including speech or dialog) and includes a portion of misheard dialog 120. A media player's current position within the audio track is indicated by vertical line 110. In conventional media player applications, marks (e.g., jump points) for rewinding (e.g., for instant replay) are typically spaced apart by a predetermined offset (e.g., in terms of time or samples), such as 10 seconds, for example. The closest mark (e.g., jump point) for rewinding from the current position 110 is indicated by vertical line 130. The position indicated by this closest mark 130 may happen to lie at a point halfway through a dialog, as illustrated in the present example, or it may be several seconds before the point (e.g., missed dialog) that is of actual interest to the user (e.g., viewer). To deal with this issue, the present disclosure provides methods and apparatus for generating navigation points (e.g., jump points) for the media content. Examples of such navigation points are indicated by vertical lines 140, 150, 160. These navigation points 140, 150, 160 are generated in such manner that they indicate points that are of particular interest for replay. For example, these navigation points 140, 150, 160 may indicate respective beginnings of dialog utterances. The generated navigation points can be embedded into metadata, for example metadata in a bitstream. That is, the navigation points can be embedded into a bitstream. Although the present disclosure is applicable to several different codecs, the navigation points may be jump points embedded into an AC-4 bitstream.

Having available these navigation points, the situation changes as follows. When the user hits rewind (or asks Siri, or hits their instant replay button, for example) the media player application can rewind and snap to the beginning of a most recent section of dialog. This rewind can be effected instantly, and the user no longer has to wait for several seconds until the replay reaches the relevant section of dialog. Because the functionality to go back to a most recent navigation point exists within conventional media player applications, streaming providers can tailor the rewind behavior to the needs of their particular user-interface. The present disclosure provides an advantage over conventional techniques by generating metadata with appropriately and accurately positioned navigation points.

Figure 2:
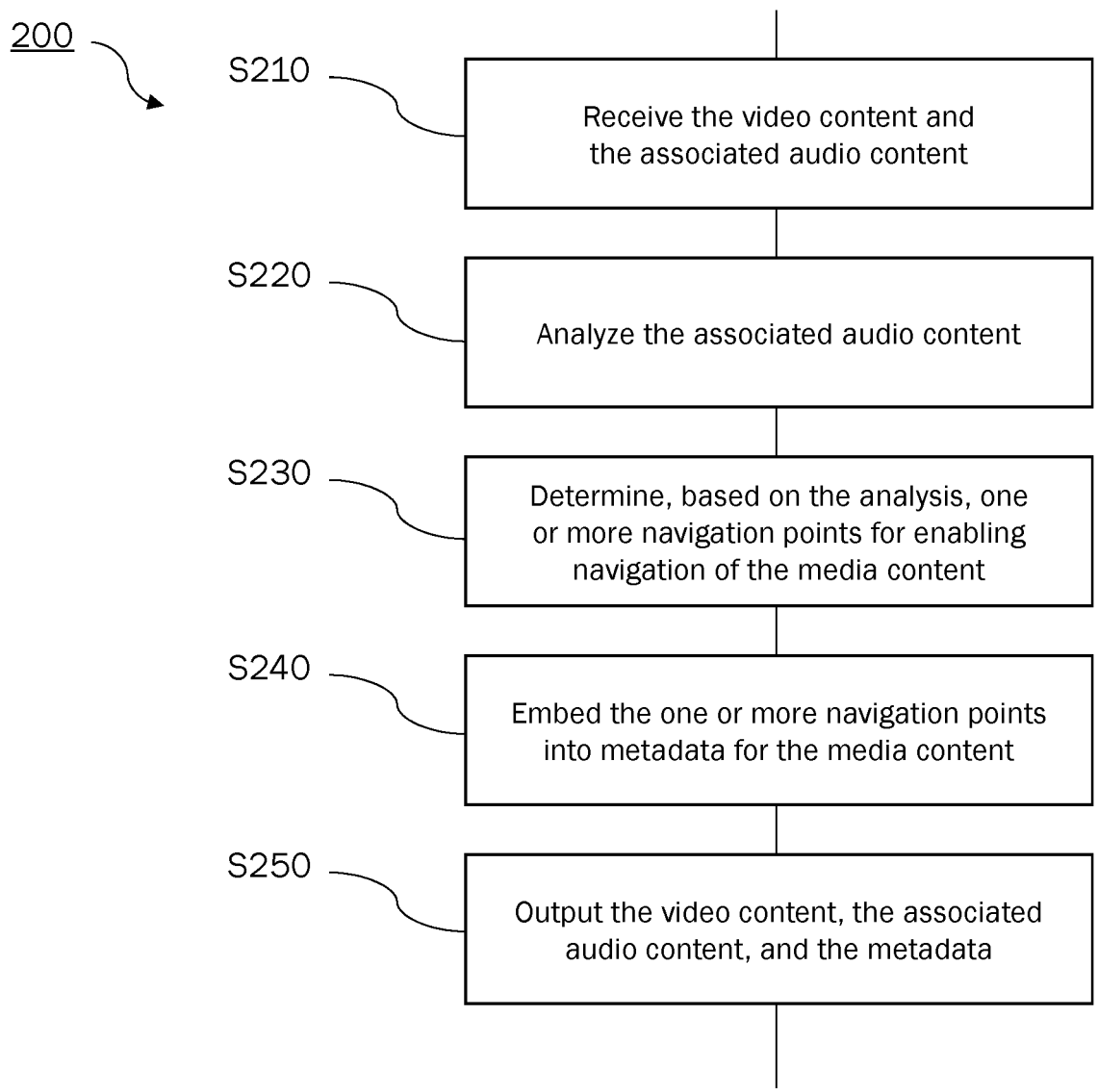
FIG. 2 is a flow chart illustrating an example of a method of processing media content according to embodiments of the disclosure.

An example of a method 200 of processing media content including video content and associated audio content according to embodiments of the disclosure is illustrated in FIG. 2. This method may also be said to be a method of generating metadata (including navigation points) for the media content. The method may be performed at a decoder (e.g., AC-4 decoder) or an encoder (e.g., AC-4 encoder).

At step S210, the video content and the associated audio content are received. The video content may comprise a video track or a portion of a video track. The audio content and the video content may be aligned (e.g., time-aligned) with each other. The audio content may comprise an audio track (e.g., channel) or a portion of an audio track. The audio track may relate to a speech or dialog track (e.g., channel), for example. The video content and the associated audio content may be received as a bitstream or in a bitstream, for example if the method is performed at a decoder. Alternatively, the video content and the audio content may be received from a storage part (storage unit), or respective storage parts (storage units), for example, if the method is performed at an encoder.

At step S220, the associated audio content is analyzed. Analyzing the audio content can involve applying speech detection (e.g., dialog detection) to the audio content. The analysis may yield, inter alia, indications of starting points of spoken utterances (e.g., dialog utterances, sections of dialog, spoken sentences) that are included in the audio content.

In certain implementations, the method may further comprise a step of applying dialog detection to the associated audio content. In this case, analyzing the associated audio content may be based at least in part on a result of the dialog detection. For example, the analysis of the associated audio content may identify positions at which respective sections of dialog (dialog utterances) begin. The dialog detection may be performed in the context of or for purposes of dialog enhancement or determining parameters (e.g., as metadata) for enabling dialog enhancement. Such parameters may relate to a flag (e.g., dialog flag) that indicates whether dialog is present in the audio content, for example.

If the method is performed at a decoder, step S220 may further comprise analyzing any metadata that is present in the received bitstream. This metadata may be referred to as associated metadata. For example, the associated metadata may be existing dialog-enhancer metadata that may be tightly aligned to dialog. Analyzing the associated metadata may assist in the determining of the one or more navigation points. Notably, audio metadata such as subtitles are not closely aligned enough with the audio to be useful in this case, as mentioned above.

At step S230, one or more navigation points (e.g., jump points, such as for jump points for an AC-4 bitstream) for enabling navigation of (e.g., through) the media content are determined (e.g., generated), based on the analysis (e.g., based on a result of the analysis). The navigation points may be jump points that indicate points (instances) within the media content to which a media player application can jump, for example when instructed to rewind, fast forward, perform an instant replay, etc. The jump points may be jump points for an AC-4 compatible media player application. The one or more navigation points can be placed at respective starting points of spoken utterances (e.g., dialog utterances, sections of dialog) that are included in the audio content. For example, the navigation points may be placed at respective starting points of spoken sentences in the audio content. This placement may be performed in accordance with respective indications of starting points determined at step S220. The one or more navigation points may be represented by respective offsets (e.g., offsets in units of time or samples) from a starting point of a frame including the respective navigation point.

Broadly speaking, step S230 yields navigation points that are more finely grained than scene transitions or chapter transitions. In particular, the navigation points occur frequently enough such that one navigation point per segment of dialog can be expected. In other words, the navigation points determined at step S230 may occur during scenes, and not necessarily (only) on scene boundaries. The navigation points determined at step S230 are positioned for improved intelligibility and coherence of the content playback when navigated to, as opposed to arbitrary points in time that are conventionally used. On the other hand, the navigation points determined at step S230 may be too numerous for global navigation, for which having jump points at scene boundaries and/or chapter boundaries makes more sense.

At step S240, the one or more navigation points are embedded into metadata for the media content (e.g., for the video content and the associated audio content). The metadata may be usable by a media player application that is capable of generating an audio-visual representation (e.g., presentation) of the media content. The metadata may enable content-aware media navigation of the media content (e.g., of the video content) by the media player application. To this end, it is preferable that the metadata is aligned (e.g., time-aligned) with the audio content (and likewise with the video content).

At step S250, the video content, the associated audio content, and the metadata are output. In other words, the media content and the metadata for the media content are output at this step.

As noted above, the method 200 may be performed at an encoder (e.g., AC-4 encoder). In this case, the method may receive mastered content (mastered media content). For example, the media content (e.g., the video content and the associated audio content) may be received from a storage part or from respective storage parts. Performing the method at the encoder may be said to encompass an offline analysis of the media content (e.g., audio content) for determining the one or more navigation points (e.g., jump points) by the encoder.

If performed at the encoder, the method can further comprise a step of receiving an input of one or more additional navigation points, for example manually determined or generated by a human operator (e.g., creative or editor). The one or more additional navigation points may relate to points of interest in the video content or the associated audio content. These points of interest may relate to interesting moments, visual gags, beginnings of action sequences, etc., for example. Thereby, points of interest in the video content and/or the audio content can be indicated by the metadata and can be made available as predefined jump points to a user's media player application.

As noted above, the method 200 may be also performed at a decoder (e.g., AC-4 decoder) or, more generally, in a playback environment. In this case, the media content (e.g., the video content and the associated audio content) may be received as or in a bitstream, for example from a compatible encoder, a compatible storage medium, a compatible media stream, etc. Performing the method at the decoder may be said to encompass an online analysis of the media content (e.g., audio content) for determining the one or more navigation points (e.g., jump points) by the decoder while the media content (e.g., video content) is being played back.

If the method 200 is performed at a decoder, a certain amount of look-ahead may be provided for generating the one or more navigation points. This means that whilst the generation of the one or more navigation points is indeed online, the decoder may retain a certain amount of not-yet-played audio content (or media content in general) for analysis purposes. This look-ahead may also ensure that navigation points are not generated too close to one another. Thus, the method 200 may further comprise buffering an amount (e.g., predetermined amount) of media content (or at least, of the associated audio content). Then, at step S220, the buffered associated audio content may be analyzed.

In this case, the method may further comprise a step of generating an audio-visual representation (e.g., presentation) of the media content, based on the video content, the associated audio content, and the metadata. Further, the method 200 may comprise any, some, or all of the following additional steps.

For example, after jumping back in time (i.e., rewinding) to one of the one or more navigation points, the media content may be modified and replayed with improved intelligibility and/or coherence. As an example, at least one of dialog enhancement, increasing of program playback loudness, muting of non-dialog audio tracks, or enabling of subtitles may be performed. That is, these measures may be performed in response to a user instruction instructing replay from one of the one or more navigation points. Performing dialog enhancement may involve enabling AC-4's dialog enhancer feature to boost and clarify the (misheard) dialog, for example. Dialog enhancement can be faded out (e.g., gracefully faded out) once the content resumes where it left off, or once a subsequent navigation point among the one or more navigation points (or among the one or more additional navigation points) is reached. In other words, the dialog enhancement can be temporal dialog enhancement that is faded out over time. This can result in a smoother experience that reduces the mental effort required of a user when they rewind media content.

Further, the method may implement one or more of the below implementations of media-aware navigation (content-aware navigation).

Conventional navigation interfaces for media content have not been substantially updated since the time of the Video Home System (VHS). The present disclosure is based on the realization that metadata that marks the locations of dialog, important moments, or scene-changes can be used to improve user experience when they make use of navigation operations such as rewind, fast-forward, pause and play.

For example, the method may comprise scrubbing (e.g., adjusting the video's global progress bar as presented by the media player application) that changes resolution depending on how much action/content is present. For example, when moving along the progress bar, the method may scrub quickly through quiet portions, and scrub slowly with more resolution through exciting scenes. In other words, the method may comprise setting a scan rate for scanning through the media content (e.g., video content) at least in part based on a density of the one or more navigation points over time. This assumes that a high density of navigation points over time is indicative of more interesting scenes, whereas a low density of navigation points over time is indicative of less interesting scenes. Alternatively, or additionally, the method may comprise setting a correspondence between points on a visual representation of a scan bar (e.g., the video's global progress bar) and points in time in the video content based at least in part on the density of the one or more navigation points over time. That is, same lengths of the scan bar (e.g., global progress bar) may correspond to different time lengths of video content, depending on a density over time of the one or more navigation points.

The method may also comprise instant replay for interesting moments, visual gags and action, for example.

The method may also comprise providing a fast-forward replay mode in which respective portions of media content (e.g., video content) are replayed starting from respective ones of the one or more navigation points. For example, a predetermined amount of video (e.g., given in a predetermined number of units of time or samples) may be replayed starting from each of the one or more navigation points. Such a fast-forward replay mode may jump from one timing of a dialog utterance to the next, for example, instead of progressing linearly in time.

The method may also comprise resuming playback of the media content (e.g., video content) after a pause of the replay at a timing indicated by a most recent one among the one or more navigation point. Thus, replay may re-start at the beginning of a current dialog utterance, even if replay has been paused halfway through the dialog utterance. Thereby, user experience is further increased, especially in cases in which an extended amount of time has passed since pausing the replay and the user may have forgotten about the content of the current dialog.

The method may also comprise extracting still images from the video content at timings indicated by the one or more navigation points (e.g., one still image per navigation point). In this case, the method may further comprise providing a visual representation of a sequence of the extracted still images for guiding user navigation of the media content. Notably, the still images may be non-uniformly spaced along the time direction. This enables higher-resolution navigation of the media content.

Figure 3:
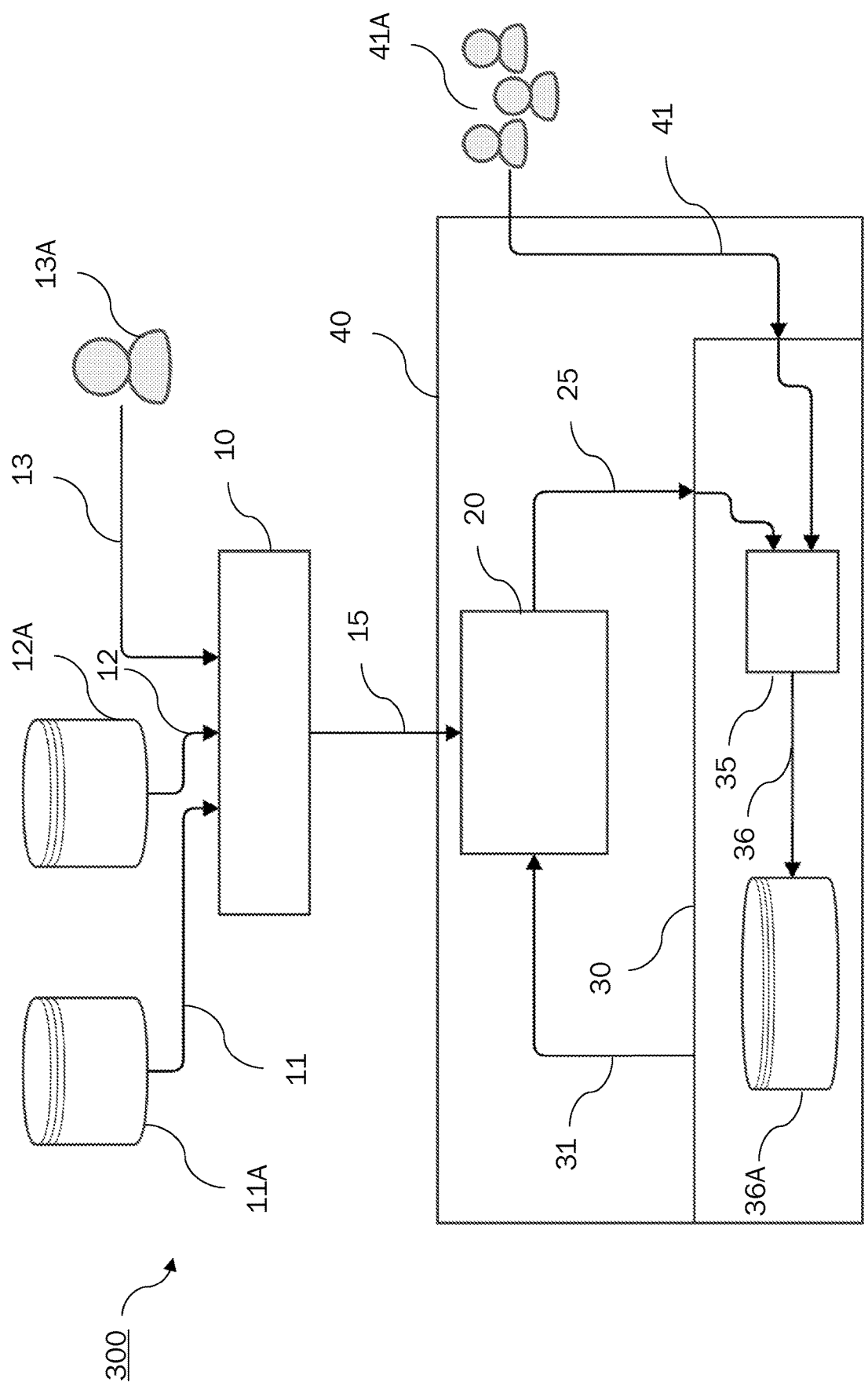
FIG. 3 is a block diagram schematically illustrating an example of an environment in which methods according to embodiments of the disclosure may be performed.

FIG. 3 is a block diagram schematically illustrating an example of an environment 300 in which methods according to embodiments of the disclosure may be performed. The environment may comprise an encoder 10 (e.g., AC-4 encoder) and a playback environment 40. The playback environment in turn may comprise a decoder 20 (e.g., AC-4 decoder) and a player application (media player application) 30. The encoder 10 may receive the media content 11 (for example as mastered content) from a media storage part 11A. Optionally, the encoder 10 may receive separate dialog stems 12 from a respective storage part 12A. Notably, storage parts 11A, 12A may be implemented by a single storage part. Optionally, the encoder 10 may receive manually contributed event metadata 13 that has been created, for example, by an operator 13A, such as a creative or an editor. The manually contributed event metadata may correspond to or comprise the one or more additional navigation points. The one or more additional navigation points may indicate interesting moments, scene changes, etc.

The encoder 10 may perform the aforementioned method for generating metadata in which the one or more navigation points are embedded, and may output a bitstream 15 that comprises, possibly in encoded form, the video content, the associated audio content, and the metadata. This bitstream 15 may be received at the playback environment 40. For example, the bitstream may be received by the decoder 20. The decoder 20 may decode the bitstream and output the video content, the associated audio content, and the metadata to the media player application 30.

Alternatively, the encoder 10 may output a bitstream 15 that only includes the video content and the associated audio content (and possibly metadata without the one or more navigation points). In this case, the aforementioned method for generating metadata in which the one or more navigation points are embedded may be performed by the decoder 20. Also in this case, the decoder 20 may output the video content, the associated audio content, and the metadata to the media player application 30.

The decoder 20 may provide the video content and the associated audio content to the media player application 30. The decoder 20 may further provide the metadata 25 to a player logic 35 of the media player application 30. The player logic 35 may further receive navigation input (navigation instructions) 41 from a user 41A. The navigation input 41 may include commands such as pause, play, rewind, etc., for example. The player logic 35 may perform the aforementioned content-aware (media aware) navigation, referring to the one or more navigation points included in the metadata 25. In other words, the player logic 35 is enabled to deal with the navigation input 41 in an intelligent way by referring to the metadata 25. A player state including a replay position and/or a replay state (e.g., playing, paused, fast-forward, etc.) may be stored in a player state storage part 36A of the media player application 30. A player state update 36 may be generated by the player logic 35. The media player application 30 may also output a request 31 for the metadata 25 to the decoder 20.

Figure 4:
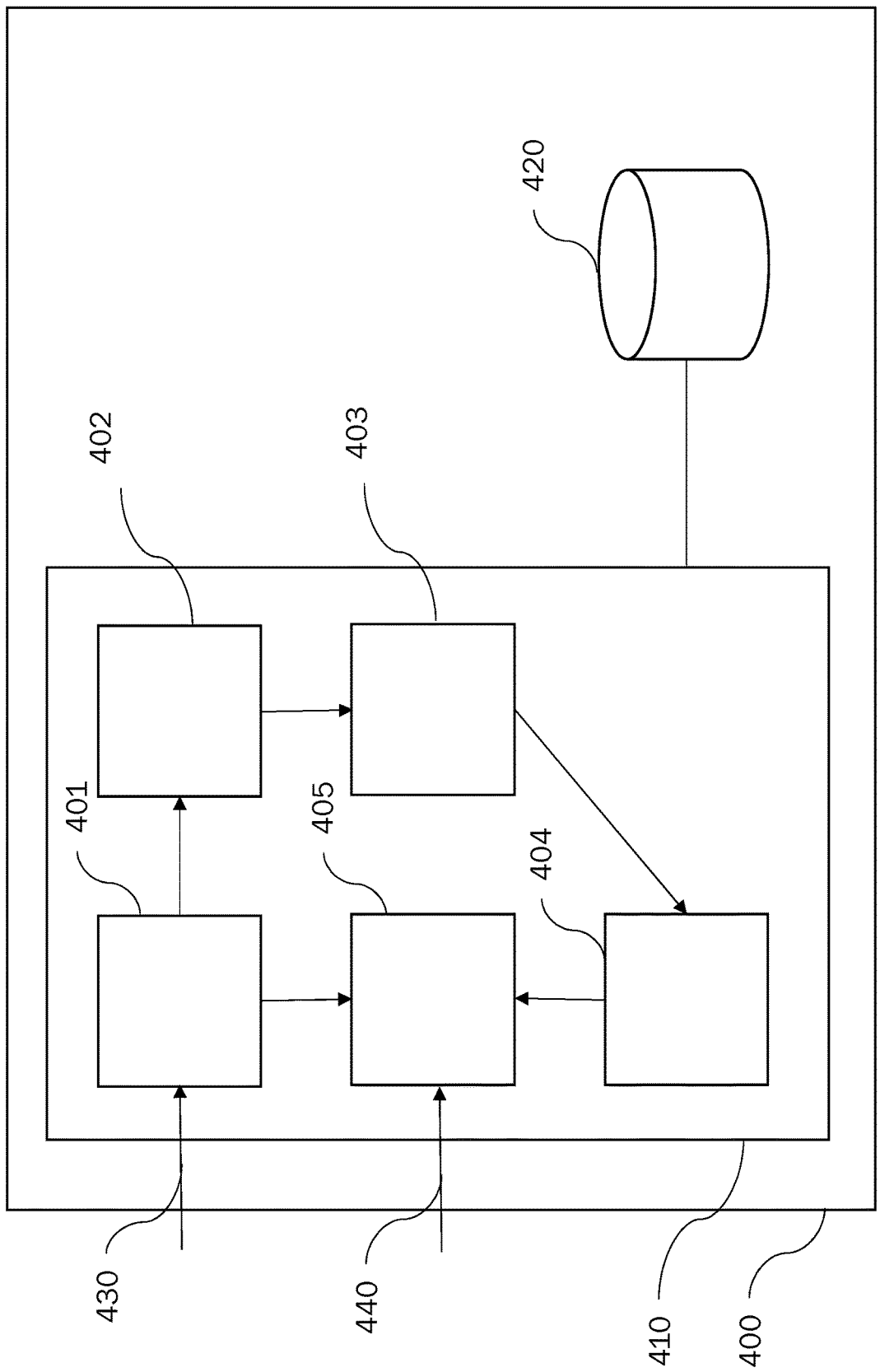
FIG. 4 is a block diagram schematically illustrating an example of an apparatus for performing methods according to embodiments of the disclosure.

It is understood that the proposed methods of processing media content may be implemented by respective suitable apparatus (e.g., encoders or decoder). Such apparatus (e.g., encoder, decoder) may comprise respective units adapted to carry out respective steps described above. An example of such apparatus for performing method 200 is schematically illustrated in block diagram form in FIG. 4. The apparatus 400 may comprise a receiving unit (input unit) 401 adapted to perform aforementioned step S210, i.e., adapted to receive the media content 430 (including video content and associated audio content), an analysis unit 402 adapted to perform aforementioned step S220, a navigation point determination unit 403 adapted to perform aforementioned step S230, a metadata processing unit 404 adapted to perform aforementioned step S240, and an output unit 405 adapted to perform aforementioned step S250, i.e., adapted to output the video content, the associated audio content, and the metadata. The receiving unit 401 may provide the audio content to the analysis unit 402. The receiving unit 401 may further provide the video content and the associated audio content to the output unit 405. The analysis unit 402 may provide a result of the analysis to the navigation point determination unit 403. The navigation point determination unit 403 may provide the one or more navigation points to the metadata processing unit 404. The metadata processing unit 404 may provide the metadata in which the one or more navigation points are embedded to the output unit 405.

It is further understood that the respective units of such apparatus 400 (e.g., encoder, decoder) may be embodied by a processor 410 that is adapted to perform the processing carried out by each of said respective units, i.e. that is adapted to carry out each of the aforementioned steps. This processor 410 may be coupled to a memory 420 that stores respective instructions for the processor 410.

It should be noted that the description and drawings merely illustrate the principles of the proposed methods and apparatus. It will thus be appreciated that those skilled in the art will be able to devise various arrangements that, although not explicitly described or shown herein, embody the principles of the invention and are included within its spirit and scope. Furthermore, all examples recited herein are principally intended expressly to be only for pedagogical purposes to aid the reader in understanding the principles of the proposed methods and apparatus and the concepts contributed by the inventors to furthering the art, and are to be construed as being without limitation to such specifically recited examples and conditions. Moreover, all statements herein reciting principles, aspects, and embodiments of the invention, as well as specific examples thereof, are intended to encompass equivalents thereof.

The methods and apparatus described in the present disclosure may be implemented as software, firmware and/or hardware. Certain components may e.g. be implemented as software running on a digital signal processor or microprocessor. Other components may e.g. be implemented as hardware and or as application specific integrated circuits. The signals encountered in the described methods and apparatus may be stored on media such as random access memory or optical storage media. They may be transferred via networks, such as radio networks, satellite networks, wireless networks or wireline networks, e.g. the Internet.

Some enumerated example embodiments (EEEs) follow:
1. A method of controlling playback of media content using metadata associated therewith, the metadata indicating a plurality of intra-scene, content-aware temporal locations (e.g., navigation points) in the media content, the method comprising:

during playback of the media content, receiving a navigation instruction; and in response to the received navigation instruction, selecting one of the temporal locations indicated by the metadata, and skipping from a current temporal location in the media content to the selected one of the temporal locations, wherein each of said temporal locations indicated by the metadata is a different temporal location at which there is substantially no dialog in the media content.

2. The method of EEE 1, wherein the navigation instruction is a skip-backwards instruction and, consequently, the selected one of the temporal locations is a nearest earlier one of the temporal locations indicated by the metadata, or wherein the navigation instruction is a skip-forwards instruction and, consequently, the selected one of the temporal locations is a nearest later one of the temporal locations indicated by the metadata.

3. The method of EEE 1 or 2, wherein the one or more temporal locations are at respective starting points of spoken utterances included in the associated audio content.

4. The method of any preceding EEE, wherein the one or more temporal locations are represented as respective offsets from a starting point of a respective current frame of the media content.

5. The method of any preceding EEE, wherein the metadata is aligned with audio content of the media content.

6. The method of any preceding EEE, further comprising:
modifying and replaying the media content with improved intelligibility and/or coherence in response to a user instruction instructing replay from one of the temporal locations indicated by the metadata.

7. The method of any preceding EEE, further comprising:
setting a scan rate for scanning through the media content at least in part based on a density over time of the temporal locations indicated by the metadata.

8. The method of any preceding EEE, further comprising:
setting a correspondence between points on a visual representation of a scan bar and points in time in the video content at least in part based on a density over time of the one or more temporal locations indicated by the metadata.

9. The method of any preceding EEE, further comprising:
providing a fast-forward replay mode in which respective portions of the media content are replayed starting from respective ones of the one or more temporal locations.

10. The method of any preceding EEE, further comprising:
resuming playback, after a pause, at a nearest earlier one of the temporal locations indicated by the metadata.

11. A method of processing media content comprising video content and associated audio content, the method comprising:
receiving the video content and the associated audio content;
analyzing the associated audio content;
determining, based on the analysis, one or more navigation points for enabling navigation of the media content, the one or more navigation points indicating points of interest in the associated audio content for short-term rewinding and/or fast forwarding;
embedding the one or more navigation points into metadata for the media content; and
outputting the video content, the associated audio content, and the metadata.

12. The method of EEE 11, wherein the media content comprises associated metadata; and
the method further comprises analyzing the associated audio content and the associated metadata.

13. The method of EEE 11 or 12, wherein analyzing the audio content involves applying speech detection to the audio content.

14. The method of any one of EEEs 11 to 13, wherein the one or more navigation points are placed at respective starting points of spoken utterances included in the associated audio content; and/or
wherein the one or more navigation points indicate respective offsets from a starting point of a respective current frame.

15. The method of any one of EEEs 11 to 14, wherein the metadata is aligned with the associated audio content; and/or wherein the metadata enables content-aware navigation of the media content.

16. The method of any one of EEEs 11 to 15, wherein the method is performed at an encoder for encoding the media content; and the method further comprises receiving an input of one or more additional navigation points.

17. The method of any one of EEEs 11 to 16, further comprising:
generating an audio-visual representation of the media content based on the video content, the associated audio content, and the metadata.

18. The method of EEE 17, further comprising:
modifying and replaying the media content with improved intelligibility and/or coherence in response to a user instruction instructing replay from one of the one or more navigation points.

19. The method of EEE 17 or 18, further comprising:
setting a scan rate for scanning through the media content at least in part based on a density of the one or more navigation points over time; and/or
setting a correspondence between points on a visual representation of a scan bar and points in time in the video content at least in part based on a density of the one or more navigation points over time.

20. The method of any one of EEEs 17 to 19, further comprising:
providing a fast-forward replay mode in which respective portions of the media content are replayed starting from respective ones of the one or more navigation points.

21. The method of any one of EEEs 17 to 20, further comprising:
resuming playback after a pause of the replay at a timing indicated by a most recent one of the one or more navigation points.

22. An encoder comprising a processor and a memory storing instructions for causing the processor to perform the operations of any one of EEEs 11 to 21.

23. A decoder comprising a processor and a memory storing instructions for causing the processor to perform the operations of any preceding EEE.

24. A program for causing a computer to perform the operations of any preceding EEE when performed on the computer.

25. A computer-readable storage medium storing a program for causing a computer to perform the operations of any preceding EEE when performed on the computer.

The invention claimed is:

1. A method of processing media content comprising video content and associated audio content, the method comprising:
receiving the video content and the associated audio content;
analyzing the associated audio content by applying speech detection to the audio content;
determining, based on the analysis, one or more navigation points for enabling navigation of the media content, the one or more navigation points indicating starting points of spoken utterances in the associated audio content for short-term rewinding;
embedding the one or more navigation points into metadata for the media content;
outputting the video content, the associated audio content, and the metadata;
providing a visual representation of a scan bar;
adjusting, during playing of the media content, movement speed of the scan bar based at least in part on the density of the one or more navigation points over time, wherein, during playing of the media content, the movement speed of the scan bar during a first portion of the scan bar is greater than the movement speed of the scan bar during a second portion of the scan bar;
in response to a user instruction instructing short-term rewinding of the media content to replay the media content from one of the one or more navigation points, modifying the media content starting at the one of the one or more navigation points for replaying the media content with improved intelligibility of the associated audio content, wherein the modifying comprises performing dialog enhancement to boost and clarify a dialog;
pausing, during replaying of the media content as modified, playback of the media content;
resuming, after pausing, playback of the media content as modified starting at the one of the one or more navigation points for replaying the media content; and
in response to reaching a subsequent navigation point during replaying of the media content as modified, fading out the dialog enhancement.

2. The method of claim 1 wherein modifying the media content further comprises muting non-dialog audio tracks and enabling of subtitles.

3. The method of claim 1, wherein modifying the media content is selectively applied to a section of the media content of particular interest to the user.

4. The method of claim 2, wherein a level of modifying the media content is fading out over time.

5. The method of claim 4, wherein the level of modifying the media content commences to return to zero at a subsequent navigation point.

6. The method of claim 1, wherein the one or more navigation points indicate respective offsets from a starting point of a respective current frame.

7. The method of claim 1, wherein the metadata is time-aligned with the associated audio content.

8. The method of claim 1, wherein the method is performed at an encoder for encoding the media content; and
the method further comprises receiving an input of one or more additional navigation points.

9. The method of claim 1, further comprising:
generating an audio-visual representation of the media content based on the video content, the associated audio content, and the metadata.

10. The method of claim 1, further comprising:
setting a scan rate for the scan bar scanning through the media content based on a density of the one or more navigation points over time, wherein a higher density of navigation points over time is indicative of more interesting media content and a lower density of navigation points over time is indicative of less interesting media content.

11. The method of claim 10, further comprising:
setting a correspondence between points on a visual representation of the scan bar and points in time in the video content at least in part based on the density of the one or more navigation points over time.

12. The method of claim 9, further comprising:
providing a fast-forward replay mode in which respective portions of the media content are replayed starting from respective ones of the one or more navigation points.

13. An encoder comprising a processor and a memory storing instructions for causing the processor to perform the operations of claim 1.

14. A decoder comprising a processor and a memory storing instructions for causing the processor to perform the operations of claim 1.

15. A non-transitory computer-readable storage medium storing a program for causing a computer to perform the operations of claim 1 when performed on the computer.

16. The method of claim 1, further comprising:
extracting still images from the video content at timings indicated by the one or more navigation points; and
providing a visual representation of a sequence of the extracted still images for guiding user navigation of the media content.

17. The method of claim 1, wherein same lengths of the scan bar correspond to different time lengths of video content based at least in part on the density of the one or more navigation points over time.

18. A method of processing media content comprising video content and associated audio content, the method comprising:
receiving the video content and the associated audio content;
analyzing the associated audio content by applying speech detection to the audio content;
determining, based on the analysis, one or more navigation points for enabling navigation of the media content, the one or more navigation points indicating starting points of spoken utterances in the associated audio content for short-term rewinding;
embedding the one or more navigation points into metadata for the media content;
outputting the video content, the associated audio content, and the metadata;
providing a visual representation of a scan bar, wherein the scan bar includes a first portion and a second portion having the same length, wherein the first portion corresponds to a first time length of video content and the second portion corresponds to a second time length of video content longer than the first time length, and wherein the first time length and the second time length are based at least in part on the density of the one or more navigation points over time;
in response to a user instruction instructing short-term rewinding of the media content to replay the media content from one of the one or more navigation points, modifying the media content starting at the one of the one or more navigation points for replaying the media content with improved intelligibility of the associated audio content, wherein the modifying comprises performing dialog enhancement to boost and clarify a dialog;

pausing, during replaying of the media content as modified, playback of the media content;

resuming, after pausing, playback of the media content as modified starting at the one of the one or more navigation points for replaying the media content; and in response to reaching a subsequent navigation point during replaying of the media content as modified, fading out the dialog enhancement.

\* \* \* \* \*